United States Patent [19]

Berg et al.

[11] 4,220,724

[45] Sep. 2, 1980

[54] METHOD FOR TREATING RAW MATERIALS CONTAINING COLLAGEN

[75] Inventors: Alexander Berg, Hirschberg; Zdeněk Eckmayer, Weinheim; Rolf Monsheimer, Darmstadt-Eberstadt; Ernst Pfleiderer, Darmstadt-Arheilgen, all of Fed. Rep. of Germany

[73] Assignee: Röhm GmbH, Darmstadt, Fed. Rep. of Germany

[21] Appl. No.: 20,085

[22] Filed: Mar. 13, 1979

[30] Foreign Application Priority Data

Mar. 25, 1978 [DE] Fed. Rep. of Germany ....... 2813075

[51] Int. Cl.² ................................................. C07G 7/00
[52] U.S. Cl. ..................................... 435/273; 435/265
[58] Field of Search ......................... 195/4–6, 195/29; 426/32, 55–57; 435/265, 273

[56] References Cited

U.S. PATENT DOCUMENTS

| | | | |
|---|---|---|---|
| 2,741,575 | 4/1956 | Keil et al. | 435/273 |
| 2,741,576 | 4/1956 | Keil et al. | 435/273 |
| 4,019,956 | 4/1977 | Saby | 195/6 |

FOREIGN PATENT DOCUMENTS 2629594  1/1977  Fed. Rep. of Germany .
2709035  9/1978  Fed. Rep. of Germany ............. 195/29

OTHER PUBLICATIONS

Kirk-Othmer, Encyclopedia of Chemical Technology, vol. 7, p. 150.
Chemical Abstracts 58, 12784 (1963).
Chemical Abstracts 68, 96816y (1968).
Chemical Abstracts 53, 78571p (1959).
Chemical Abstracts 71, 20948j (1969).
Chemical Abstracts 71, 90058t (1969).

*Primary Examiner*—Lionel M. Shapiro
*Attorney, Agent, or Firm*—Curtis, Morris & Safford

[57] ABSTRACT

A method for conditioning a collagen-containing raw material to render it adaptable to hot-water extraction of collagen and collagen degradation products therefrom, which comprises incubating said raw material in an aqueous bath containing a neutral or alkaline protease at a pH between 6.5 and 13 in the presence of a member selected from the group consisting of urea, guanidine, or an acid addition salt of quanidine.

6 Claims, No Drawings

METHOD FOR TREATING RAW MATERIALS CONTAINING COLLAGEN

The present invention relates to methods for treating or conditioning collagen-containing raw materials to render them adaptable to the extraction of halogen degradation products therefrom with hot water.

Collagen-containing raw material is used in industry as a basis for the manufacture of various final products which require that the collagen not be degraded substantially beyond a molecular mass of $1 \times 10^4$. Examples of such industrially-produced final products are gelatin, glue, collagen threads, and collagen sheets [cf. G. Reich in the monograph "Kollagen," pages 256 to 262, published by Verlag Steinkopff, Dresden, (1966)].

The method for obtaining the above-indicated industrial products from collagen will be explained using gelatin as example.

The starting material for the production of gelatin is, as is known, collagen, a fiber protein which is contained in bones and in the connective tissue of animals and which forms the stroma of hides, numerous inner membranes, tendons, cartilage, and fish scales. The structure of collagen is well known.

Gelatin is produced industrially predominantly from bones and hide (bone and hide gelatin).

As the raw material for the preparation of gelatin, the waste products and by-products of tanneries, the leather-industry, slaughterhouses, and butcher shops are primarily used. For producing hide gelatin, calf hides and ox hides, as well as side and leg sections which are delivered freshly limed or salted, also split glue stock in limed, dried, or salted state, as well as the skins of young pigs, etc., are used, for example. For the manufacture of bone gelatin, bone scrap, skin bones, waste from bone lathe-cutting plants, selected head bones, shoulder blades, etc., come into consideration.

On conversion of collagen into the desired final products, such as gelatin, glue, collagen threads, and collagen sheets, the structure of the collagen is partly retained. Industrial processes for obtaining the aforementioned products must keep this prerequisite in mind.

Depending on the decomposition or pretreatment of the raw material, one can distinguish between two types of gelatin: alkaline-limed gelatins and acid-limed gelatins. The acid-limed gelatins, which are made primarily from the skin of young pigs, will not be considered for the present invention.

Treatment with alkali ("liming") effects a chemical conversion of the collagen so that it later dissolves when boiled with hot water. The manufacture of gelatin comprises a number of operations. When bones are used as a raw material, cleaning, defatting, and comminuting must first be effected.

Then the tri-calcium phosphate contained in the bone tissue is dissoled out by treatment for 8 days to 14 days with dilute acid (it is "macerated"). The bone material (ossein) is washed and then limed with a 5% to 15% calcium hydroxide solution for about 3 weeks to 16 weeks. After completion of the liming, adherent lime is removed from the bones in mechanical washing plants and the bones are then neutralized. This washing and cleaning of the raw material coming from the liming requires large quantities of water.

Gelatin is then extracted from the bone collagen which has been washed neutral as a colloidal solution at temperatures between 40° C. and 90° C. in a plurality of "extracts".

When skins are used as a raw material, one proceeds in a similar manner as with bones. Native skin material is first freed of preservative salt by the addition of milk of lime (to commence the swelling process). Treatment is then effected with milk of lime of 6° to 7° Baume for about 3 weeks until the hair is perfectly loosened. Thereupon the hairs are removed and the skin material is comminuted and again limed for about 12 weeks to 15 weeks with milk of lime. The skin collagen is then worked up further in the same manner as described in connection with bone gelatin.

The preparation of gelatin from skin splits follows the method for native skin material. The skins are comminuted and then limed for about 8 weeks to 14 weeks. Further treatment proceeds in the same way as in the case of bone gelatin.

The recovery and treatment of gelatin by shaping, spinning, and rendering are also well known in the art and are described, for instance, in Ullmanns Encyclopaedie der technischen Chemie, Vol. II, 3rd Edition, pages 630–642 and in Vol. 12, 4th Edition, pages 211–220, both incorporated herein by reference.

The collagen content of the specific raw materials treated is in general known.

It is clear that the degree of degradation of the collagen and, related hereto, the quality of the degradation product, depend on the digestion and thermal hydrolysis. In aqueous solution, for instance, the gelatin molecules are present with relative molecular masses from about 4000 to about $4 \times 10^6$. In practice, one reckons with molecular masses of about 11,000 to 100,000 for gelatin.

The various treatment steps, particularly the liming of the collagen-containing material, require disproportionately long periods of time and there has been no lack of attempts to shorten the liming and, insofar as possible, to improve the quality of products as gelatin.

Certain prior art teaches the use of microorganisms such as Saccharomyces, Mycoderma, or Torulopsis for conditioning hide scraps for glue extraction.

Other prior art recommends an enzyme extract of *Aspergillus flavus* and, in addition, pancreatin, to accelerate the liming of leather waste. Also, the treatment of collagen-containing material with acid proteases at an acid pH is recommended for the production of gelatin. The incubation of a calf skin at a pH of 2.9 with proctase from *A. niger var. macrosporus* for 48 hours is given as an example.

In accordance with still other prior art, one possibility for the production of gelatin consists in converting collagen fibers into soluble monomeric collagen molecules using proteolytic enzymes. An enzyme having a broad specificity, for instance pronase in the presence of calcium chloride, is recommended. According to still further prior art, a solution of a neutral or alkaline proteolytic enzyme is advantageously used at a pH between 7 and 13 for 4 to 72 hours at 20° to 40° C. for the "alkaline or neutral conditioning" of collagen for the extraction of gelatin. Specific mention is made of trypsin, Bacillus proteases, and the alkalases (alkaline-resistant proteases) described in DE-OS 1,800,508 and DE-OS 1,807,185.

It has now been found that, surprisingly, the duration of the process for digesting collagen (as present in bone material after maceration and in raw materials based on skin or connective tissue, after possible removal of preservative salt, hair, etc.) to a condition in which degradation products such as glue, gelatin, etc., can be removed by extraction with hot water can be reduced to a fraction of the time required by the prior art processes if the said collagen-containing raw materials are incubated with neutral and/or alkaline proteases in a solution having a pH between 6.5 and 13 at a temperature between 18° C. and 40° C. in the presence of urea and/or guanidine and/or acid addition salts of the latter.

As raw materials for the method of treating collagen according to the present invention, known materials, for instance the materials mentioned above having a base of bones and/or skins or hides, are used. In particular, ossein, as well as fresh, limed or salted hides, and splits which are in limed, dried, or salted condition after carrying out customary measures which precede liming, can be used as substrates in the method of the invention.

The collagen-containing raw materials which can be used as sources of collagen according to the invention and their pre-treatment prior to conditioning according to the invention are well known in the art and are described, for instance, in the chapter "Raw Materials and Technology of Gelatin Manufacture", found in The Science and Technology of Gelatin Manufacture, edited by A. G. Ward and A. Courts, Academic Press, 1977, pages 295–361, incorporated herein by reference.

Among the neutral and/or alkaline proteases to be used according to the invention, enzymes obtained both from microorganisms and from higher organisms are included. Particular mention may be made of neutral and/or alkaline proteases of bacterial origin, for instance the proteases isolated from Bacillus strains. Mention may be made, for instance, of the neutral and/or alkaline proteases from *B. licheniformis, B. firmus, B. pumilis, B. cereus, B. mycoides, B. alcalophilus, B. subtilis,* and *B. parasiticus,* as well as the neutral bacterial protease from *Streptomyces griseus.* There may also be mentioned the neutral and/or alkaline fungal proteases, for instance those from *Aspergilli,* such as *A. oryzae, A. sojae, A. flavus,* and those from *Paec. varioti, Rhiz. chinensis,* and *Mucor pusillus.* Also vegetable proteases such as papain, bromelin, and ficin should be mentioned, as well as the pancrease proteases, and also combinations of the aforementioned enzymes. The designation "neutral" or "alkaline" proteases refers to the relative pH range of activity [cf. Ullmanns Enzyklopaedie der Technische Chemie, edited by E. Bartholome et al., Volume 10, pages 517 and 522, published by Verlag Chemie Weinheim (1975)]. By "neutral" proteases there are to be understood those having an activity range between pH 5.5 and 7.5 and by "alkaline" proteases those having an activity range between pH 7 and 12.

In the method of the present invention, it is desirable to establish a pH which is close to the optimum activity of the particular enzyme or enzymes used. The temperature must possibly also be adapted to the activity conditions for the enzymes selected. In general, the incubation temperatures are between 18° C. and 40° C. A value from 30 to 120, and particularly from 30 to 100, Loehlein-Volhard units (L.V.U., as defined below) per gram of collagen contained in the raw material can be considered a guide value for the concentration of the enzymes to be used in accordance with the present invention.

The (known) characteristic data of the individual enzymes (temperature optima, stability conditions) should suitably be maintained, as far as technically feasible.

It must be deemed extremely surprising that, in the process of the invention, the conditioning of the raw materials is promoted in an industrially highly-desirable manner by the use of neutral or alkaline proteases with the addition of urea. The preferred range for the addition of urea to the enzymatic batch is from 0.004 g to 0.04 g, and preferably from 0.01 g to 0.03 g, per gram of collagen in the dry collagen-containing raw material. Guanidine, which can be added to the batch as such or in the form of an acid addition salt thereof, is suitably present in the same amounts (calculated as the free base in the case of salt addition).

Furthermore, the experience obtained from the conditioning process of the prior art can be utilized in carrying out of the method of the invention.

The method of the invention makes it possible to reduce the conditioning time to about 4 to 24 hours. The advance obtained thereby is considerable.

The method of enzymatic digestion to obtain gelatin according to the present invention can be interrupted when the conditioned material is adaptable to the extraction of degradation products therefrom with hot water. (For a definition of this condition, see "Sudreife" in G. Reich, loc. cit., page 244; and also Example 1.) Thereupon the enzyme or enzymes are suitably inactivated, for instance by acidifying the material.

Further processing into gelatin, glue, collagen threads, and collagen fibers can be effected in a known manner.

In the method according to the present invention, known additives for the enzymatic reaction, such as activators, stabilizers, etc., may be used. The proteolytic activity of enzymes is customarily determined by the Anson hemoglobin method [cf. M. L. Anson, J. Gen. Physiol. 22, 79, (1939)] or in terms of the "LVU" (Loehlein Volhard Unit) in accordance with the Loehlein Volhard method [The Loehlein Volhard Method for the Determination of Proteolytic Activity", Gerbereichem, Taschenbuch, Dresden-Leipzig (1955)]. By a Loehlein-Volhard Unit there is understood that amount of enzyme, in grams, which digests 1.725 mg of casein under the specific conditions of the method.

A better understanding of the present invention and of its many advantages will be had by referring to the following specific examples, given by way of illustration.

EXAMPLE 1

The starting material for conditioning is ox pelt soaked with water and limed with lime and sodium sulfide. 1 kg of ox pelt is combined with 1.5 liters of water at 40° C. The temperature is maintained at 40° C. on a water bath and treatment is effected for four hours at a pH of 10.0, without agitation, using:

1 g of alkaline bacterial protease from *Bacillus licheniformis* (9000 LVU);

4 g of urea; and 20 g of calcium hydroxide.

By this time, the pelts were conditioned, i.e. they could be pierced with a finger and the fibers isolated by rubbing between the fingers. The weight of the pelt was reduced to 635 g. Thereupon the pelt material was first washed several times with demineralized water. In order to inhibit enzyme action, the pelt material was introduced into a solution of 200% of demineralized water at 20° C. and 4 g of sulfuric acid (98%), with frequent stirring. the pH of the solution was 3.0. After 3 hours the liquor was discarded. Thereupon the pelt material was washed several times with demineralized water until a neutral pH was reached. It was then rendered with 150% of demineralized water for 4 hours at 70° C. 150 g of non-renderable material were obtained. The yield was 85%. The material was then filtered. for deodorization, 0.5 g of activated charcoal are added to the filtrate. After centrifuging, filtration is again effected. The material is then concentrated in a vacuum evaporator at 30° C. (The percentages given above and below are by weight, based on the water-containing raw material used.

Comparable results are obtained using proteases from *B. pumilis, B. cereus, B. mycoides,* and *B. alcalophilus.*

EXAMPLE 2

1000 g of freshly limed split cowhide is weighed into a 2 liter beaker and combined with 1.5 liters of water at 40° C. For treatment there are added:

2 g of bacterial protease from *Bacillus subtilis* (9000 LVU);
8 g of urea; and
10 g of caustic soda solution (33%).

The pH of the solution was 11.5. To maintain the temperature constant, treatment was effected on a water bath for 8 hours at 40° C. After this time the pelts were conditioned. The weight in this condition was 300 g. Further treatment was carried out in the same manner as in Example 1. After rendering, no residue was obtained, i.e. there was complete conversion.

EXAMPLE 3

1000 g of limed split ox hide are weighed into a 2 liter beaker and combined with 1.5 liters of water at 40° C. The treatment is carried without movement and, to maintain a constant temperature, in a thermostatic bath at 40° C. The time of treatment is 10 hours. For treatment were added:

1.5 g of bacterial proteinase from *Bacillus firmus* (9000 LVU);
6.0 g of urea;
20.0 g of calcium hydroxide.

The pH of the solution was 10.2. Rendering, washing, inhibition of the enzyme activity were as in Example 1. After rendering, a residue of 50 g of non-renderable material was obtained.

Conversion: 90%.

EXAMPLE 4

1000 g of limed split cowhide are weighed into a 2 liter beaker and combined with 1.5 liters of water at 40° C. The treatment is effected without agitation. To the solution are added:

1.5 g of fungal protease from *Aspergillus parasiticus* (9000 LVU);
6.0 g of guanidine hydrochloride; and
20.0 g of calcium hydroxide.

The pH of the solution is 10.2.

Washing, inhibition of the enzyme activity, and rendering, are as in Example 1. After rendering, a residue of 80 g of non-renderable material is obtained. Yield: 80%.

Comparable results are obtained using fungal proteases from *A. oryzae, A. sojae,* and *A. flavus.*

EXAMPLE 5

1000 g of limed hide splits are weighed into a 2 liter glass beaker and combined with 1.5 liters of water (40° C.). For treatment, 2.5 g of neutral bacterial protease from *Bacillus subtilis* (9000 LVU) and 6 g of urea are added. The pH is 8.0. Incubation was carried out in a water bath without agitation for 6 hours. Recovery of the degraded collagen product follows as in Example 1.

What is claimed is:

1. A method for conditioning a collagen-containing substrate to adapt it to a subsequent hot-water extraction of collagen and collagen degradation products therefrom, said substrate being selected from the group consisting of ossein, prepared fresh, limed, and salted hides and prepared limed, dry, and salted splits, said prepared hides and splits being dehaired prior to conditioning, which method consists essentially of incubating said substrate in an aqueous bath consisting essentially of water, a neutral or alkaline protease, and urea, guanidine, or an acid addition salt of guanidine, said bath having a pH between 6.5 and 13, and then inactivating said protease when the substrate is adaptable to hot-water extraction.

2. A method as in claim 1 wherein said urea, guanidine, or guanidine salt (calculated as the free base) are present in an amount from 0.004 g to 0.04 g per gram of collagen present in said raw material.

3. A method as in claim 1 wherein said protease is an alkaline bacterial protease from *Bacillus subtilis, Bacillus firmus,* or *Bacillus licheniformis,* or is a fungal protease from *Aspergillus parasiticus.*

4. A method as in claim 1 wherein said protease is present in an amount from 30 LVU to 120 LVU per gram of collagen in said raw material.

5. A method as in claim 1 wherein said protease is present in an amount from 30 LVU to 100 LVU per gram of collagen in said raw material.

6. A method as in claim 1 wherein said raw material is incubated for from 4 to 24 hours.

* * * * *